(12) United States Patent
Bunker

(10) Patent No.: US 6,866,005 B1
(45) Date of Patent: Mar. 15, 2005

(54) ANIMAL WATERING APPARATUS

(75) Inventor: Peter Noel Bunker, Cambridge (NZ)

(73) Assignee: Trofftop Products Limited, Auckland (NZ)

( * ) Notice: Subject to any disclaimer, the term of this patent is extended or adjusted under 35 U.S.C. 154(b) by 92 days.

(21) Appl. No.: 10/344,172

(22) PCT Filed: Aug. 7, 2000

(86) PCT No.: PCT/NZ00/00150
§ 371 (c)(1),
(2), (4) Date: Jun. 4, 2003

(87) PCT Pub. No.: WO02/11525
PCT Pub. Date: Feb. 14, 2002

(51) Int. Cl.$^7$ .............................................. A01K 7/00
(52) U.S. Cl. ......................................... 119/72; 119/74
(58) Field of Search ............................. 119/72, 74, 78, 119/81; D30/132

(56) References Cited

U.S. PATENT DOCUMENTS

| 4,003,340 A | | 1/1977 | Kuzara et al. ................ 119/78 |
| 4,286,546 A | * | 9/1981 | Moore .......................... 119/72 |
| 4,542,715 A | * | 9/1985 | DeRoos ........................ 119/72 |
| 4,646,687 A | | 3/1987 | Peterson et al. ............... 119/73 |
| 4,708,091 A | | 11/1987 | Schafer ........................ 119/73 |
| 4,739,727 A | | 4/1988 | Boyer .......................... 119/73 |
| 4,786,205 A | * | 11/1988 | Hisken et al. ................ 119/72 |
| 5,174,245 A | | 12/1992 | Bishop ......................... 119/73 |
| 5,791,287 A | | 8/1998 | Gruber ......................... 119/74 |
| 6,142,101 A | * | 11/2000 | Pelsor ......................... 119/74 |

FOREIGN PATENT DOCUMENTS

| NZ | 260398 | 4/1994 |
| NZ | 1007569 | 5/1999 |

* cited by examiner

Primary Examiner—Charles T. Jordan
Assistant Examiner—Elizabeth Shaw
(74) Attorney, Agent, or Firm—Trexler, Bushnell, Giangiorgi, Blackstone & Marr, Ltd.

(57) ABSTRACT

An animal water trough having a cover structure which fits within the trough and preferably adapted to float on the surface of trough water to substantially cover the whole water surface area. Receptacles or channels are provided in the cover. Apertures, which communicate with the water trough, are provided in the channel walls to convey water from the trough into the receptacle or channel. Preferably, a substance dispenser is located in the cover, which feeds substances into the trough water.

21 Claims, 4 Drawing Sheets

ANIMAL WATERING APPARATUS

TECHNICAL FIELD

This invention relates generally to animal watering apparatus. In a preferred form the invention includes a device to dispense health and food supplements to farm animals.

BACKGROUND OF THE INVENTION

The use of troughs to water farm animals is common place. Troughs normally have a system for automatically replenishing water consumed by animals such as a valve connected to a ball-cock mechanism.

The exposed nature of conventional troughs means the water within the trough may become contaminated by outside matter such as sprays and fertiliser. The exposed nature of the trough also promotes algae growth which can foul the water or make the trough undesirable for animals to drink from. Foreign bodies such as branches, plant matter, rubbish, bird droppings and so forth, may also be introduced to the trough and increase the risk of bacteria, such as Salmonella or Botulism, being passed to the animals drinking from the trough. As a consequence, the troughs must be cleaned and foreign matter removed, which can at times be time consuming and labourious.

Attempts have been made to provide a trough that protects the water from foreign debris. An example of an attempt can be found in U.S. Pat. No. 4,003,340. This patent discloses a stock watering trough that is kept covered at all times when not in use by a pair of floating lid sections hingedly attached on opposite sides of a centre support within the trough. The lid sections have a crowned configuration that results in the marginal edges of the lid sections being immersed below the level of the water upon which they float. While this invention overcomes a number of the problems associated with trough contamination, the lids cannot be retrofitted with ease to existing troughs. The farmer must either perform considerable alterations on existing troughs, or buy a new unit, which may be very expensive.

U.S. Pat. No. 4,739,727 discloses an animal waterer having an insulated container for holding water, a supply conduit for supplying water under pressure to the container and a valve connected to the supply conduit for maintaining the water in the container substantially at a predetermined level. An insulated lid is sealingly attached to the top of the container and has a pair of openings in it each large enough to permit an animal to extend its mouth through for the purpose of drinking water from the container. A flexible length member extends between and is rotatably attached to two closure members at each end of the length and is used to close off the openings in the container. A biasing structure, preferably a cable extending over a pulley and having a weight attached to one end, where the other end is attached to an intermediate part of a link member, holds the closure members against the bottom of the openings the container to keep them closed at all times except when an animal is pushing them down to drink from the container. The apparatus of this invention is complex and difficult to install.

Farm animals require regular watering, and often need to receive medical or nutritional supplements, such as minerals and zinc. Therefore, the provision of a supplement dispensing device within a trough may be advantageous.

It is convenient to dispense treatment substances, such as medicaments or nutrients via the animals drinking water in such a trough. It may also be desirable to release the substance into the water over time, rather than simply mixing the substance into the water, as correct concentrations may need to be maintained over time. It is also inconvenient to have to continually go to troughs and top up the substance volume.

Some attempts have been made to provide a means of slowly dispensing a substance in a trough New Zealand Patent No. 260398 provides a bag or a sock into which a substance can be introduced, wherein the bag is placed in a trough for slow release of the substance. However, the problems associated with debris, algae, and other foreign contamination of the water still persist.

The ball-cock mechanisms used in the troughs to maintain the water level are often damaged by farm animals drinking from the trough. This may lead to the water valve remaining on and causing water wastage, or remaining off and causing the trough to dry up.

BRIEF SUMMARY OF INVENTION

It is an object of the present invention to provide a trough and trough components which go at least some way to overcoming the abovementioned disadvantages or to at least provide the industry with a useful choice.

Accordingly in a first aspect the invention may broadly be said to consist in an animal watering apparatus comprising:
 a trough capable in use of storing a volume of water,
 a cover structure which substantially covers the whole of the water surface area,
 at least one open receptacle provided in the top of said cover of sufficient volume to accommodate the muzzle of at least one animal, and
 means in said cover which in use convey water from said trough into said receptacle.

In a second aspect the invention may broadly be said to consist in a cover for an animal drinking trough comprising:
 a structure which in use fits within said trough and which is adapted to float on the surface of said water to substantially cover the whole of the water surface area,
 at least one receptacle provided in the top of said cover of sufficient volume to accommodate the muzzle of at least one animal, and
 means in said cover, which in use, conveys water from said trough into said receptacle.

In a third aspect the invention may broadly be said to consist in a method of protecting the water in an animal drinking trough by covering the top of said trough and allowing animals access to only a small exposed area of water using the trough cover defined above comprising the steps of:
 trimming the periphery of said cover to a size which allows it to fit within said trough, and
 placing the cover so trimmed onto the surface of the water in said trough.

DETAILED DESCRIPTION

The present invention provides a cover structure for water troughs, tanks, pans or other waterers to provide uncontaminated drinking water for animals and also envisages a complete watering apparatus including the cover structure in combination with the trough. In the preferred embodiment the cover fits within the trough and floats on the water within the trough. The water is accessed by the animals from a channel built into the cover which exposes a water surface area which is a small fraction of the exposed water surface in the open trough. A dispenser may be located in the cover, to dispense nutrients, medicaments or water treatments to the trough water.

Although the cover preferably floats on top of the water within the trough the cover may be provided so as to fit onto the periphery of the trough. Alternatively, the cover may be mechanically supported or attached within the trough.

Figure 1:
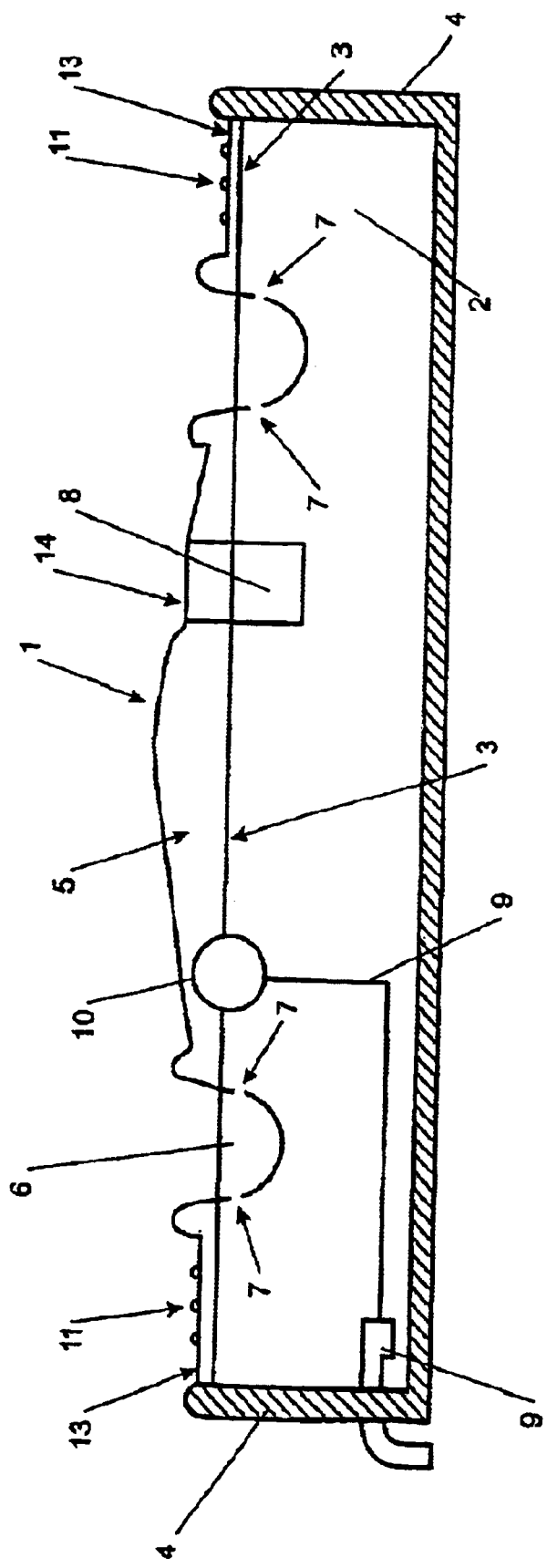
FIG. 1 is a cross sectional view of the preferred embodiment of the watering apparatus of the present invention.

Referring to FIG. 1, a cover 1 floats on top of a body of water 2, that has a water level as indicated by the line 3, contained in the trough 4. The cover 1 is moulded from a polyethylene material as a single unit. The cover 1 floats on top of the water due to the buoyancy of the cover. This buoyancy is provided by both the material in which the cover is made of, and the shape of the cover, which increases the volume of water displaced, namely, the volume 5 between the cover 1 and water 2.

Figure 2:
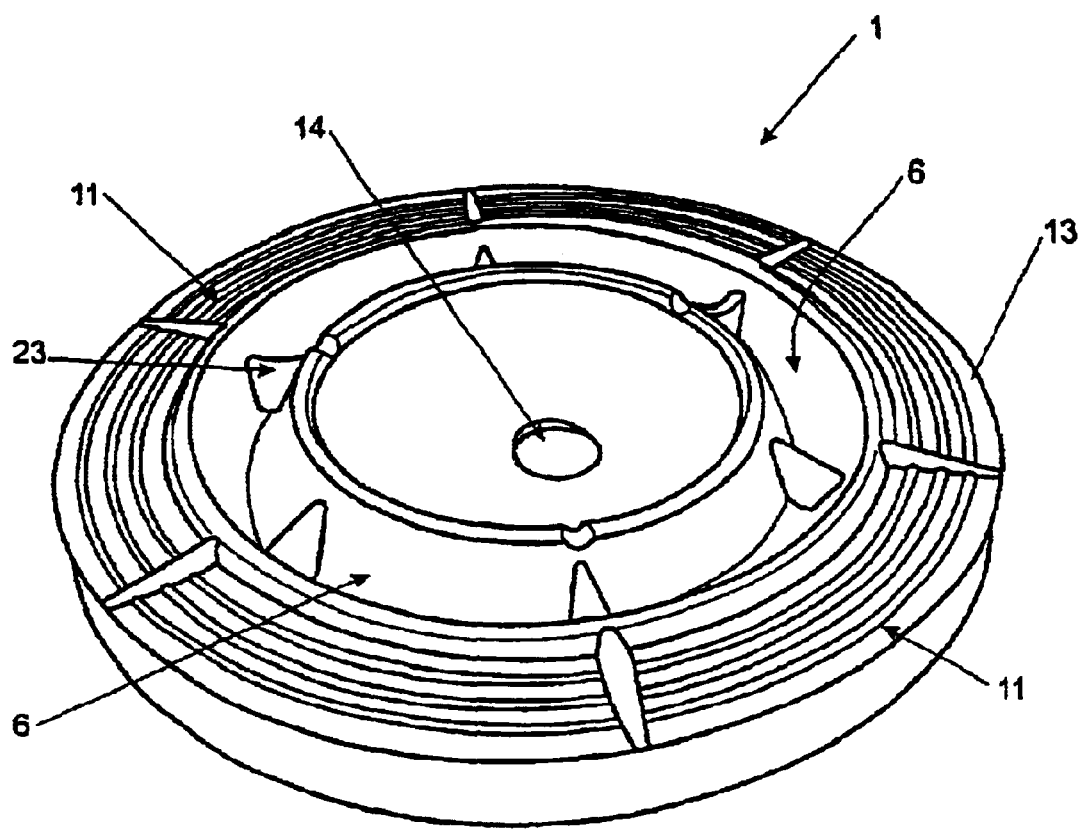
FIG. 2 is a perspective view of the watering apparatus shown in FIG. 1.

The cover 1, as shown in FIG. 2, is preferably circular in shape, so as to fit within conventional circular troughs. While one aspect of the invention involves retrofitting covers to existing troughs insitu, the manufacture of a trough with matching cover is also envisaged. Although in the preferred form the trough 4 is circular in horizontal cross-section other shapes may be used, or in the case of retro-fitting an existing trough other shapes must be accommodated. For example, trough shape may be country specific or animal specific. Therefore, the cover 1 may be provided in an alternative shape, such as square, rectangular or octagonal to be able to be fitted into respectively shaped troughs 4. In the preferred form, the cover 1 has a perimeter slightly less than the trough 4 to allow it to float freely within the trough walls.

It should be appreciated that drinking animals may deplete the trough faster than it can be filled and it is desirable that the cover should stay in a fixed relationship with the water level. Some known troughs have tapered sides and with a floating cover when the water level within the trough falls the cover may become lodged on the sides of the trough and possibly terminating the flow of water from the trough into the channel 6. To prevent this occurrence, the cover may be provided with an adjustable skirt, such as flexible brushes, to allow the cover's effective inside perimeter to be reduced as the cover falls with the falling water level.

The cover 1 is formed with a water dispensing channel 6. This takes the form of a U-shaped annular indentation in the surface of the cover at about mid diameter. Apertures 7 are provided in the channel walls to allow water to flow from the trough into the dispensing channel 6, thereby allowing access to the water 2 by an animal. The channel 6 is of sufficient width to accommodate the muzzle of an animal. Alternative means for allowing animals to access trough water could be used. For example a number of receptacles could be distributed around the cover each with apertures to allow the admission of water from the trough and each dimensioned to allow access by at least one animal.

The water level under the cover 1 needs to be adjusted so that the outer flange 13 is not be below water level 3. Although the flange 13 and cover 1 must sit deep enough in the water 2 to allow water to flow into the channel 6.

In some forms of the watering apparatus of the present invention, the cover 1 may have attached to it a substance dispenser 8, so as to introduce medicaments or nutrients to the animals drinking the trough water, or chemicals to treat the water. The dispenser 8 is a substantially rigid structure that houses the substance. The dispenser is shaped, dimensioned and located in the cover, preferably within the recess area 14, such that when the cover 1 is placed in the trough 4, the lower section of the dispensing apparatus 8 is submerged in the water 2 and the substance is dispersed into the water at a regulated rate.

Alternatively, the substance dispenser may be located on or proximate to the annular channel 6 so that substances are only dispensed into the water being held within the channel 6. This would conserve water treatment substances and nutrients, as only the water within the channel would be treated and not all of the water within the trough.

The dispensing of the substance may be by any type of mechanism, for example, small apertures (not shown) within the structure of the dispenser 8 allowing the substance to slowly dissolve and flow from the apertures to disperse in the water 2.

The cover 1 and substance dispenser 8 are preferably made from polyethylene and formed by vacuum moulding, although it is possible to use other forms of moulding such as, rotational or injection moulding. Furthermore, it is possible to form the cover 1 and substance dispenser 8 from fibreglass, plastic, or other mouldable materials.

Alternatively, the cover may be formed by being pressed out of appropriate materials, such as polycarbonate, steel or aluminium.

The substance dispenser 8 may be formed as an integral part of the cover 1 during the moulding process. Alternatively, the dispenser 8 may be separately formed then attached to the cover 1, after the cover has been formed.

Figure 3:
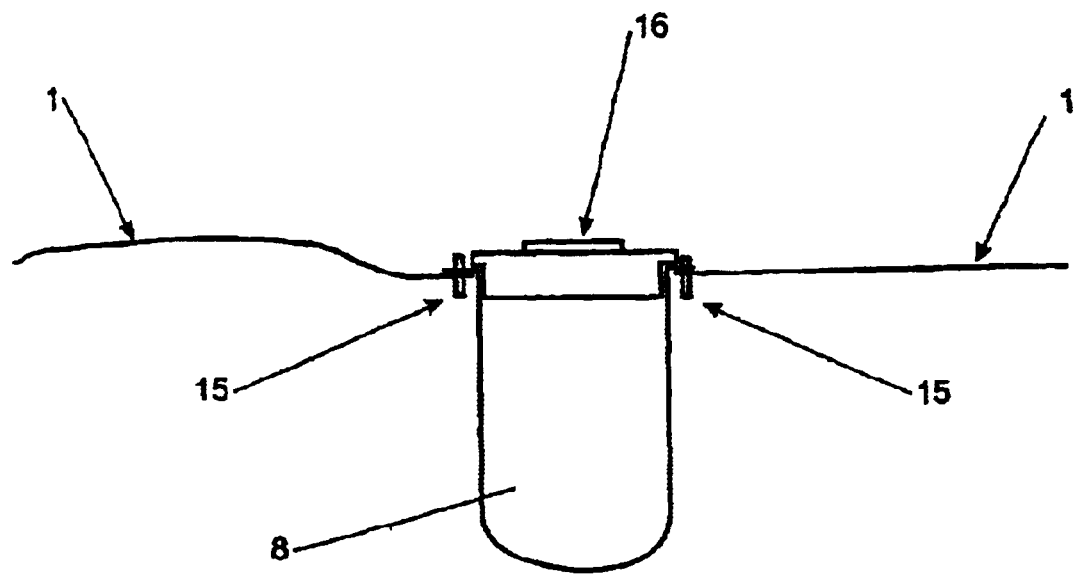
FIG. 3 is a side view of a substance dispenser that may be provided in the watering apparatus.

With reference to FIGS. 2 and 3, in the preferred embodiment of the invention the recess area 14 is moulded within the cover during moulding, and is preferably circular in shape, but other appropriate shapes may be used. When the cover 1 is put into use within a trough, the farmer may cut out the circular area 14 and place within the remaining hole a preformed dispensing container 8, as shown in FIG. 3. The dispenser 8 will have a complementary shape, preferably circular to that of the recess 14, thereby allowing the dispenser 8 to be placed into the recess 14 and then attached to the cover 1 by way of an air tight connection, such as gaskets 15.

The dispenser 8 is provided with a detachable lid 16 that can be removed and substances placed within the dispenser 8. The lid 16 is preferably a thread type lid, where the dispenser is provided with complementary threads thereby when the lid is threaded into the dispenser the vacuum beneath the cover 1 is maintained In other forms of the watering apparatus the dispenser 8 may be moulded into the cover, this is preferably by way of injection moulding. Again, a separate and detachable lid is provided that fits within the dispenser 8 to maintain the vacuum beneath the cover 1.

Figure 4:
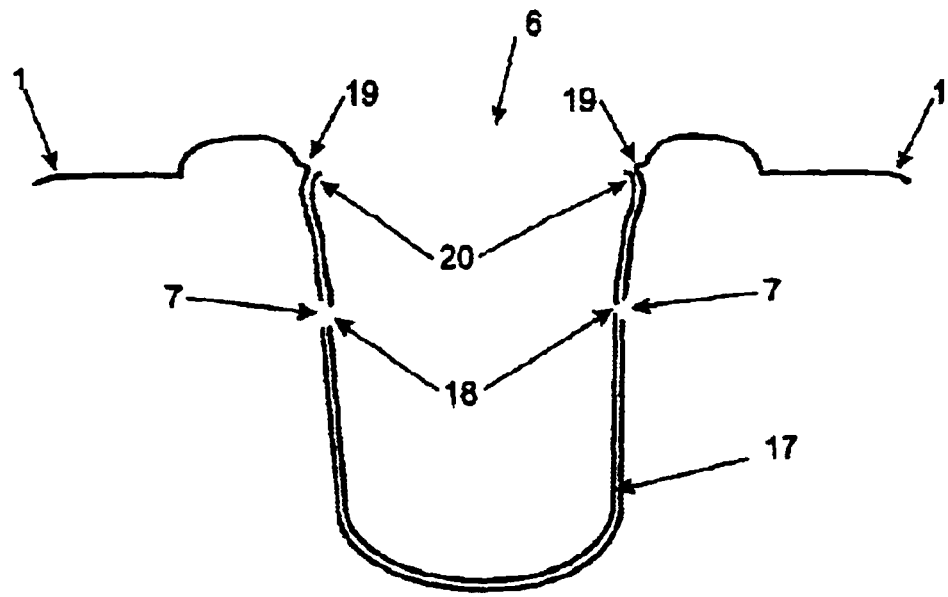
FIG. 4 is a cross-sectional view through the watering apparatus, particularly showing an annular channel or receptacle provided within the cover of the watering apparatus and inserts that may be placed within the channel.

In further forms of the watering apparatus the cover 1 may be provided with channel inserts 17, as shown in FIG. 4. These inserts 17 are located within the annular channel 6 and have the purpose of allowing the farmer to easily remove and clean the inserts, thereby not requiring the whole cover 2 to be removed from the trough 4 so that the channel 6 may be cleaned.

In use, and shown in FIG. 4, the insert 17 is placed within the channel 6 and has within it apertures 18 that are aligned with the channel apertures 7, so that water may flow into the channel 6 lined with the insert 17. The insert 17 is preferably held within the channel 6 by protrusions 19 that have been formed in the cover 1 at the upper regions of the channel 6 on both channel walls. Therefore, a farmer can push the insert 18 into the channel 6 and the protrusions 19 retain the insert 18 within the channel 6. An insert 17 can be removed by a farmer by gripping the lips 20 and pulling the insert 17 from the channel 6.

Figure 5:
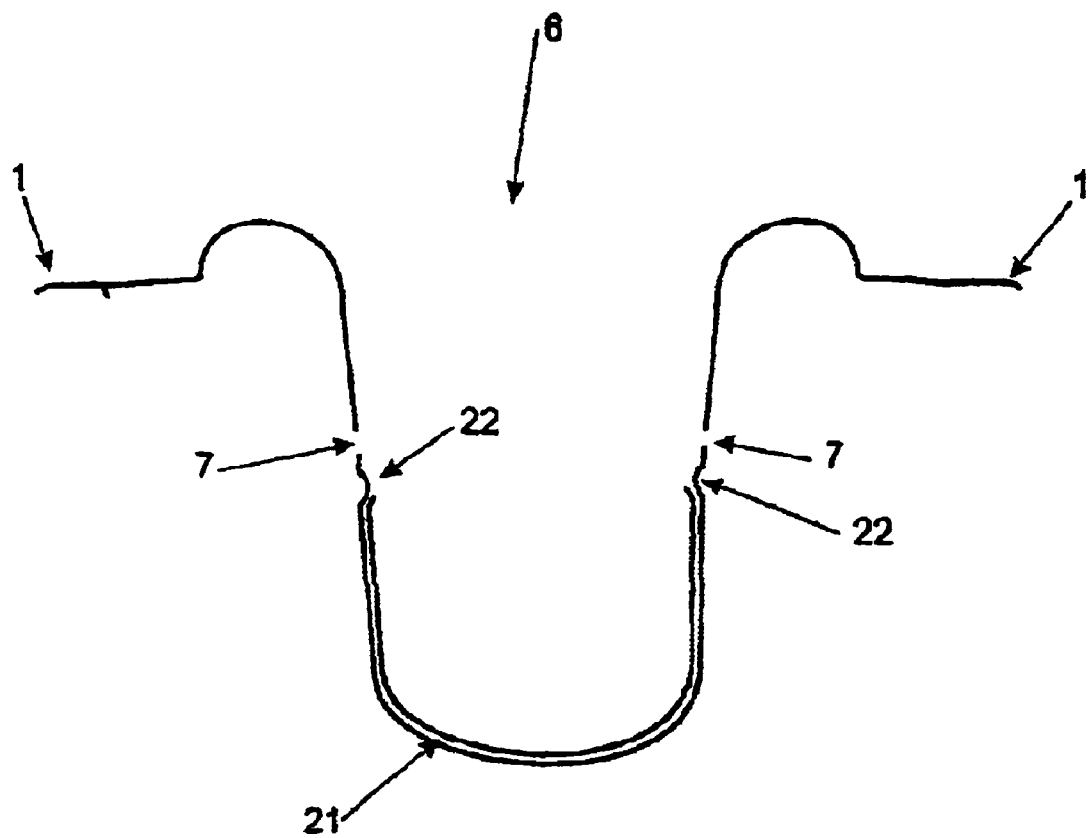
FIG. 5 is a cross-sectional view through an alternative form of the watering apparatus, illustrating an alternative insert that may be placed within the annular channel or receptacle.

In other forms, an insert 21 may only extend to a vertical location on the channel 6 only to a height just below that of the apertures 7, and protrusions 22 are located at this position, as illustrated in FIG. 5, to retain the insert 21 within the channel. In this form the insert 21 is not provided with apertures, as the insert 21 is located below the channel apertures 7 and water can readily flow into the insert 21.

Although it is envisaged that protrusions and lips, as described above, are used to retain the insert within the channel 6, other means may be used to perform this function.

Preferably the cover 1 has provided a channel 6 that additionally has divisions 23, as illustrated in FIG. 2, that provide a partial division of the channel 6. These divisions 23 do not rise above the water level within the channel 6 and have the purpose of stopping water from moving around the channel 6 to prevent the cover from becoming unstable and capsizing. The divisions 23 allow for a limited amount of water 2 to move from each division in the channel. In this form, the insert 17 is provided in sections to fit into each of the channel sections between the divisions 23.

Most troughs are fed with water by a ball-cock activated valve, as shown in FIG. 1. The cover 1 is shaped so as not to interfere with the movement of the ball 10, by providing a significant clearance between the ball 10 and the cover 1. Furthermore the cover 1 protects the ball 10 and associated lever arm from possible damage by the animals drinking from the trough 4. In some cases where a trough is retrofitted with a cover of the present invention the ball-cock mechanism may not sit in an appropriate position within the trough to give sufficient clearance between the cover and the ball. In such a case the lever arm of the ball can be extended to allow the ball to be positioned in an area where there is sufficient clearance between the cover and the ball.

The cover 1 is preferably provided with a diameter that closely matches the maximum diameter of known troughs. Furthermore, the cover is preferably provided with outer perimeter sections 11, of which three are shown in FIGS. 1 and 2. If the cover diameter exceeds that of the trough 4, any number of sections 11 may be cut from the cover so as to enable the cover 1 to be placed with in the trough 4 with sufficient clearance to allow the cover to float and move freely within the trough.

To install, a required number of sections 11 must be trimmed from the cover, after which the cover can be placed within the trough 4 so that it floats on the water within the trough.

Once the cover 1 is floating within the trough 4, if the cover 1 is provided with a substance dispenser 8, nutrients, medicaments, water treatment chemicals or additives to improve the palatability of the water within the trough may be placed into the dispenser 8 by removing the lid 16, as shown in FIG. 3, and placing a predetermined amount of the substance within the dispenser 8. The dispensing channel 6 having apertures 7 provide a receptacle in which animals may drink the water from. The apertures 7 also have the function of preventing the remaining volume of the water 2 within the trough 4 from being contaminated by external bodies introduced by the animals drinking from the trough.

The watering apparatus of the present invention provides many advantages. The cover, as it floats within a trough and covers the water, prevents outside elements from contaminating the water, for example, sprays, fertiliser or other animal excrement or other small animals. The cover also prevents sunlight and UV rays getting into the bulk of the water thus discouraging algae growth and decreasing the evaporation of water due to sunlight.

The provision of an area such as the dispensing channel allows a firmer to easily remove any debris fallen into the channel by simply scooping the debris out. Furthermore, the channels in collecting debris also prevent any debris from entering the trough and contaminating the water under the cover. It is also easy to install and is adaptable to existing trough sizes. The cover may also be readily removed and cleaned, or if the cover is provided with inserts, each insert may be removed and individually cleaned with ease.

In the preferred form, the cover provides a covering for existing and new troughs that allows for the dispensing of substances such as, medicaments, nutrients and water treatments, into the water and prevents contamination of the water thereby improving the quality of the water in which the animals drink.

The watering apparatus furthermore protects water supply equipment within troughs as it prevents or deters animals from getting into the troughs thereby preventing damage to the ball-cock mechanisms and contamination of the water within the trough.

The provision of the dispenser with the cover allows a farmer to dispense an animal treatment substance, or water treatment substance or additive, into the water within the trough at a regulated rate, without having to individually dispense the substance to the farm animals, thereby saving time.

What is claimed is:

1. An animal watering apparatus comprising:
   a trough capable in use of storing a volume of water,
   a cover structure which substantially covers the whole of the water surface area,
   at least one water-tight receptacle provided in the top of said cover structure, where the area of said receptacle is sufficient to accommodate the muzzle of at least one animal, and
   means in said cover structure which in use convey water from said trough into said receptacle, said means to convey water being at least one aperture located in the wall of said receptacle.

2. An animal watering apparatus according to claim 1 wherein said cover structure fits within said trough and is adapted to float on the surface of said water.

3. An animal watering apparatus according to claims 1 or 2 wherein said receptacle is an annular channel provided within said cover structure.

4. An animal watering apparatus according to claim 3 wherein said receptacle has walls that are provided with apertures which in use are below the trough water level to thereby allow water to enter from said trough into said channel.

5. An animal watering apparatus according to claims 1 or 2 wherein said receptacle is a plurality of individual reservoirs.

6. An animal watering apparatus according to claim 1 further including at least one peripheral section or rib in said cover structure, said section or rib capable of being removed from said cover structure to reduce the diameter of said cover structure.

7. An animal watering apparatus according to claim 1 wherein said receptacle protrudes below said trough water surface when said cover structure is fitted within said trough.

8. An animal watering apparatus according to claim 1 wherein said cover structure is provided with a substance dispenser which in use protrudes downwardly from said cover structure into said trough water.

9. An animal watering apparatus according to claim 1 wherein said cover structure and said receptacle is formed as a unitary plastics moulding.

10. An animal watering apparatus according to claim 1 including removable annular inserts, located within said receptacle.

11. A cover for an animal drinking trough, said trough capable in use of storing a volume of water, said cover comprising:

a cover structure which substantially covers the whole of the water surface area, at least one water-tight receptacle provided in the top of said cover structure, where the area of said receptacle is sufficient to accommodate the muzzle of at least one animal, and means in said cover structure which in use convey water from said trough into said receptacle, said means to convey water being at least one aperture located in the wall of said receptacle.

12. A cover for an animal drinking trough according to claim 11 wherein said cover structure fits within said trough and is adapted to float on the surface of said water.

13. A cover for an animal drinking trough according to claim 11 or 12 wherein said receptacle is an annular channel provided within said cover structure.

14. A cover for an animal drinking trough according to claim 13 wherein said receptacle has walls that are provided with apertures which in use are below the trough water level to thereby allow water to enter from said trough into said channel.

15. A cover for an animal drinking trough according to claim 11 or 12 wherein said receptacle is a plurality of individual reservoirs.

16. A cover for an animal drinking trough according to claim 11 further including at least one peripheral section or rib in said cover structure, said section or rib capable of being removed from said cover structure to reduce the diameter of said cover structure.

17. A cover for an animal drinking trough according to claim 11 wherein said receptacle protrudes below said trough water surface when said cover structure is fitted within said trough.

18. A cover for an animal drinking trough according to claim 11 wherein said cover structure is provided with a substance dispenser which in use protrudes downwardly from said cover structure into said trough water.

19. A cover for an animal drinking trough according to claim 11 wherein said cover structure and said receptacle is formed as a unitary plastics moulding.

20. A cover for an animal drinking trough according to claim 11 including removable annular inserts, located within said receptacle.

21. A method of protecting the water in an animal drinking trough by covering the top of said trough and allowing animals access to only a small exposed area of water comprising the steps of:

providing a cover structure which substantially covers the whole of the water surface area, at least one water-tight receptacle provided in the top of said cover structure, where the area of said receptacle is sufficient to accommodate the muzzle of at least one animal, and means in said cover structure which in use convey water from said trough into said receptacle, said means to convey water being at least one aperture located in the wall of said receptacle, trimming the periphery of said cover structure to a size which allows it to fit within said trough, and placing the cover structure so trimmed onto the surface of the water in said trough.

\* \* \* \* \*

UNITED STATES PATENT AND TRADEMARK OFFICE
CERTIFICATE OF CORRECTION

PATENT NO. : 6,866,005 B1 Page 1 of 1
DATED : March 15, 2005
INVENTOR(S) : Peter Noel Bunker It is certified that error appears in the above-identified patent and that said Letters Patent is hereby corrected as shown below:

<u>Title page,</u>
Item [56], References Cited, FOREIGN PATENT DOCUMENTS,
"NZ      1007569      5/1999" should be -- NL      1007569      5/1999 --

Signed and Sealed this

Seventeenth Day of May, 2005

JON W. DUDAS
*Director of the United States Patent and Trademark Office*